Patented Oct. 26, 1954

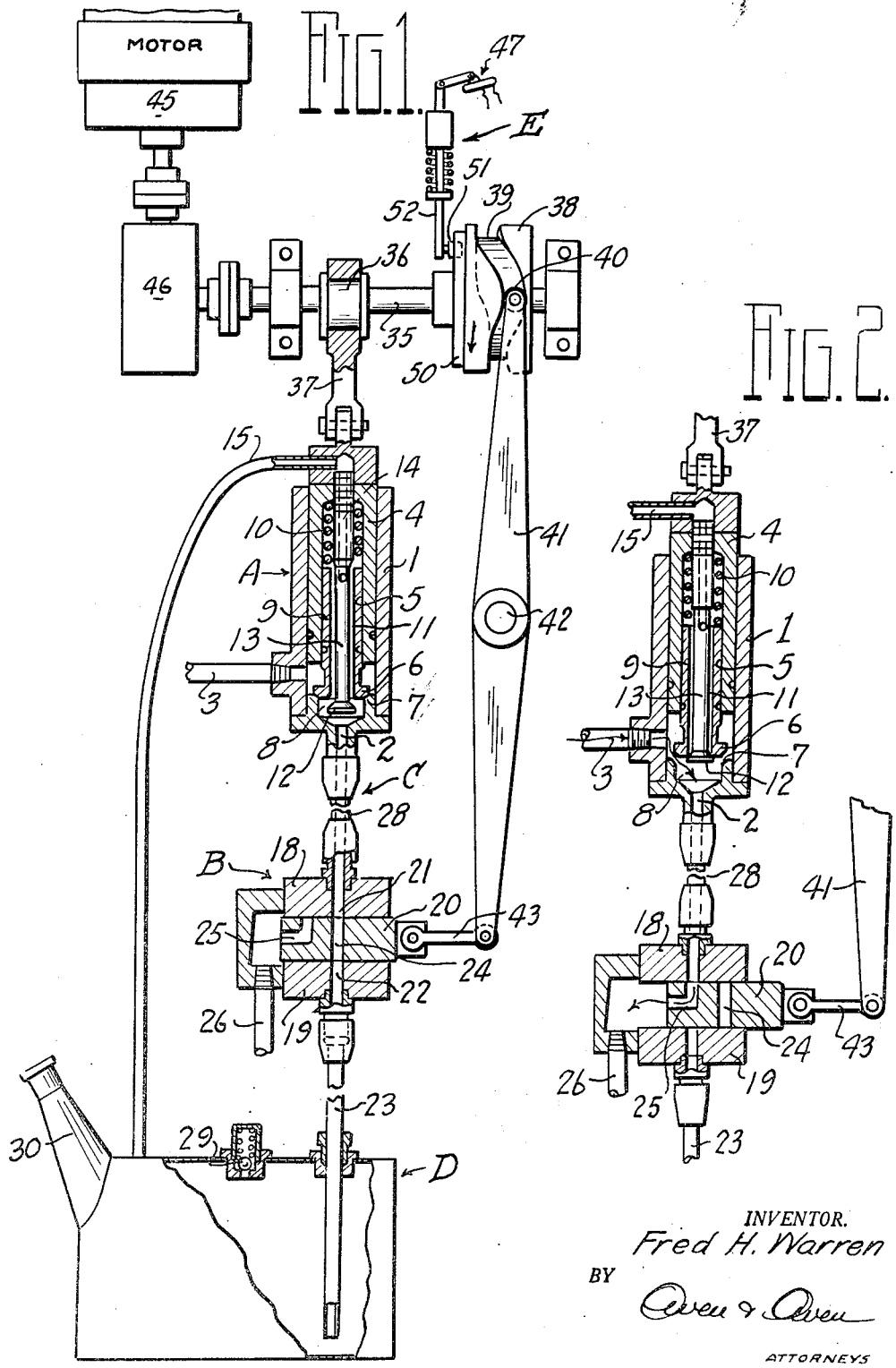

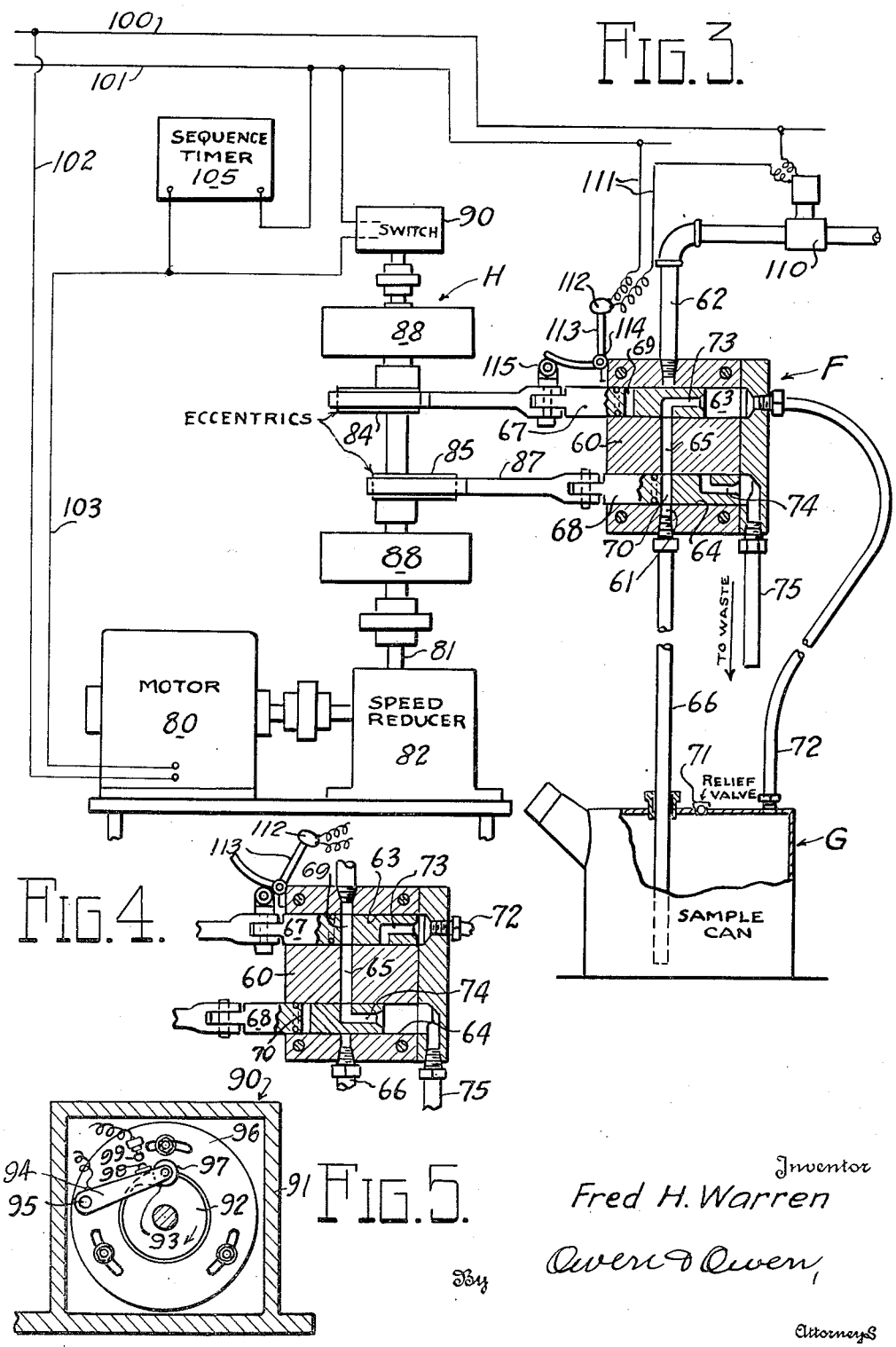

2,692,502

UNITED STATES PATENT OFFICE 2,692,502

AUTOMATIC LIQUID SAMPLE DISPENSER

Fred H. Warren, Findlay, Ohio

Application February 24, 1953, Serial No. 338,229

18 Claims. (Cl. 73—422)

This application is a continuation-in-part of my prior application Serial No. 284,239, filed April 25, 1952, which has been abandoned in favor of the present application.

This invention relates to means for dispensing measured quantities of liquids, and is intended primarily for use in the oil industry to obtain successive oil samples for testing purposes, but is not restricted to such use.

In many industries it is customary to remove a small quantity of liquid from a stream flowing from a pipe or conduit for quality determination or control. Each sample withdrawn from the stream must be of uniform volume and may be taken at regular intervals as to time, or proportionally to rate of flow. It has been common in the oil industry to withdraw a one-half pint oil sample manually each hour from a uniformly flowing stream and pour it into a two gallon sample can after first having cleared the sampling line of liquid remaining from a previous sample by drawing it into a waste liquid container or sump. This method will produce a sample particularly representative of the stream at the instant of sampling but is subject to irregularities due to the human element and is too expensive if samples are taken frequently enough to give a representative sample of the entire stream. With volatile materials much evaporation results from repeatedly removing the sample can lid and from exposure to the air while pouring from the cup to the sample can.

Many designs of automatic samplers are in use today in the oil industry, some of which clear the sampling line of liquid from the previous sample and some do not. One of the earlier designs uses solenoid operated valves controlled by a sequence timer. The machines usually clear the sampling line before taking a sample, but are objectionable for the reason that the size of the sample must be regulated (1) by the time the sampling valve remains open, and (2) by using a throttle valve between the line being sampled and the sampler, which causes the size of each sample to vary as the line pressure varies. Furthermore, this type of sampler is not suitable for sampling high pressure streams, as the sample is discharged into the sample can at high velocity which creates turbulence and causes evaporation losses.

Another common type of automatic sampler, of which there are several variations in design, employs a small motor-driven direct-acting pump, which actually pumps liquid out of the line. This is generally referred to as a continuous sampler because the pump operates continuously and takes many very small samples each minute. This type is objectionable, particularly when used in connection with oil streams, as the pump valves and passages are so small that they become clogged in service and there is a tendency for composite samples taken therewith to run low in impurities, indicating that some separation takes place in the sampling line.

The object of the present invention is the provision of an improved sampler of the character described which obviates the above-noted objections in the use of samplers now generally used.

Further objects of the invention are the provision of a device of this character which is automatically operable to withdraw samples of uniform volume from a flowing liquid stream regardless of the pressure therein; also the provision in such a device of automatic means for clearing the sampling line and sampler of all liquid remaining from the previous sample; of means for trapping a portion of the column of liquid flowing through the sampling line while still in motion so that all foreign matter, such as sediment and water carried in the liquid, will be held in suspension until the sample has been taken, and of means for transferring the samples to the sample can without turbulence so as to minimize loss of liquid by evaporation.

Other objects and advantages of the invention will be apparent from the following detailed description, and from the accompanying drawings illustrating the invention, and in which—

Fig. 1 is an elevation of a sampler embodying the invention, with parts broken away and in section and with the moving parts in the at-rest position they assume at the end of a sample taking cycle;

Fig. 2 is a similar view of the valve parts with the valves in position for clearing the sampling line after a previous sample has been taken;

Fig. 3 is an elevation of a different embodiment of the invention, with parts broken away and the electric wiring diagrammatically shown, and with the valves in sample releasing positions corresponding to the valve positions in Fig. 1;

Fig. 4 is a fragmentary view of the valve structure, with parts in section and with the valves in positions corresponding to the positions of the valves in Fig. 2, and Fig. 5 is an enlarged sectional detail of the operation controlling limit switch.

One illustrated apparatus embodying the invention, and shown in Figs. 1 and 2, includes an admission and vent valve unit A, a distributor valve unit B, a sample metering connection C between the units A and B, a sample can D, which receives metered samples from the distributor valve B, and the operating and control means E for the valves.

The sampling and vent valve unit A comprises a preferably cylindrical stationary body or casing 1 having one end, its top in the present instance, open and its opposite end provided with a restricted outlet passage 2. The flowing or supply line for the sampler is designated 3, and this communicates with the interior of the casing 1 through a side thereof and adjacent to the outlet passage 2. A cross-head 4 of cylindrical form is mounted in the casing 1 for longitudinal reciprocatory movements therein and with its inner end terminating adjacent to the inlet from the supply line 3. This cross-head is sealed against leakage of fluid pressure therearound within the casing 1, and has a closed outer end and an axial bore 5 extending from its inner to near its outer end.

An admission valve 6 is disposed in the closed end portion of the casing 1 and is adapted to seat on a raised annular shoulder 7 to close the communication between the outlet 2 and the inlet from the pipe 3 a distance inwardly from the former, thus providing a space 8 at the inlet end of the casing. The valve 6 is carried by a stem 9 which extends into the bore 5 of the member 4 and has a sliding leak-proof fit therein. A coiled expansion spring 10 in the inner end of said bore acts against the stem and holds the valve yieldingly seated on the shoulder 7 when the member 4 is at the inner end of its stroke in the casing 1.

A passage 11 extends axially through the valve 6 and its stem, and the lower end of this passage or that which opens into the space 8 is closed by a vent valve 12 when the valve 6 is raised from its seat by an outward movement of the member 4, as shown in Fig. 2. The stem 13 of the valve 12 projects freely through the passage 11 to provide a vent space therebetween, and the opposite or inner end of the stem projects axially through the spring 10 and is threaded or otherwise suitably anchored in the outer end portion of the member 4, so that the valve and member move together in the casing 1. The inner end portion of the stem 13 has a vent passage 14 therein that opens at one end to the vent space around the stem and at its other end communicates with a tube 15, preferably flexible, that extends to and opens into the interior of the sample can D.

The distributor valve unit B is located below the unit A and comprises spaced upper and lower stationary casing parts 18 and 19, respectively, between which a slide valve 20 operates. The part 18 has a port 21 in communication with the outlet 2 of the sampling unit A through the sample metering connection C, while the part 19 has a port 22 in communication with the sample can D through a discharge tube 23. The slide valve 20 has a passage 24 therethrough which, when the valve is in one position of its movement, registers with and opens communication between the two ports 21 and 22, as in Fig. 1. The valve also has an angled passage 25 therein which, when the valve is in another position of its movement, opens communication between the port 21 and a drainage pipe 26 leading to any suitable place of disposal of drainage from the sampling system, thus permitting purging of the system of all liquid remaining from the previous sample.

The volume of liquid collected for each sampling operation is determined by the size of the space 8 in the sampling valve unit and the liquid-holding capacity of the metering connection C, and this may be varied by changing the inside diameter or length of the tube 28 in said connection.

The sample can D consists of a closed vessel capable of withstanding internal pressure, and has a gland type fitting through which the delivery pipe 23 is projected. It is also provided with a normally closed relief valve 29 and preferably with a stoppered pouring spout 30.

The control and operating means E for the various valves includes a shaft 35 having an eccentric 36 thereon connected by a pitman 37 to the outer end of the cross-head member 4, whereby an inward and an outward stroke movement is imparted to said member at each complete revolution of the eccentric. The shaft 35 also has a cam drum 38 with a circumferential cam groove 39 therein and in which operates a roller 40 carried at one end of a lever 41. This lever is fulcrumed at 42 and has its opposite end connected to the distributing valve 20 by a link 43 so as to impart shifting movements to the valve when the shaft is rotated. The cam groove 39 is so shaped that when the shaft 35 is at rest, after a sample taking cycle, the lever 41 stands in the position shown in Fig. 1 in which the valve passage 24 registers with the casing ports 21 and 22. As the cam 38 starts its rotation at the start of a sampling cycle, and in the direction indicated by the arrow, the cam groove 39, in approximately the first 90° movement of the cam, moves the valve 20 to the right so as to move the passage 24 out of, and the drainage passage 25 into, register with the port 21 (as shown in Fig. 2), thus permitting drainage from the sample metering parts, whereby to remove any portions of a previous sample remaining therein. The valve continues in this position during approximately the next 90° movement of the cam 38, and at the end of such movement the cam groove 39 acts on the lever 41 to move the valve 20 to a position in which its passages 24 and 25 are at opposite sides of, and both out-of-register with, the port 21. Such position of the valve is maintained until the cam 38 is near the end of its cycle where the lever 41 is operated to move the valve 20 to sample distributing position in which position the passage 24 registers with the casing ports 21 and 22. This position of the valve is then maintained until the start of the next sampling cycle.

The shaft 35 is driven by an electric motor 45 through a speed reducer shown conventionally at 46. The starting of the motor may be manually controlled by use of a starting switch, but is preferably effected by a sequence timer (not shown), inasmuch as the present device is for withdrawing samples of uniform volume and at predetermined intervals. Once the sampling cycle is started, the motor circuit will be maintained closed by a holding switch, indicated at 47, and in a manner well understood in the art, until the shaft 35 has completed a single revolution or cycle. The switch 47 is controlled from a cam ring 50 on an end of the cam 38 through a roller 51 engaging the inner cam surface of the ring and by a connection 52 with the switch. The manner of driving and controlling the shaft rotation is not in itself new and, therefore, is only more or less conventionally shown.

It will be understood from the foregoing that in the operation of the sampler, the parts thereof are in the positions indicated in Fig. 1 during at-rest periods or intervals between cycles and also that the taking of a sample occurs during a single revolution of the shaft 35.

At the start of a cycle the driving motor will rotate the shaft 35 and the eccentric 36 will first act to close the vent valve 12 and then to lift the admission or sampling valve 6 from its seat to permit flow from the pipe 3 into the metering tube 28. Simultaneously, cam groove 39 will act on lever 41 to position slide valve 20 so that waste passage 25 will register with port 21 of the distributor valve and direct the flow of liquid through pipe 26 to a sump or sewer, thus purging the system of all liquid remaining from the previous sample. When the shaft has made approximately one-half a revolution, the admission valve 6 will start to close and cam groove 39 will shift lever 41 to move distributor valve 20 to a position to place valve passages 24 and 25 at opposite sides of port 21, thus stopping flow through the valve 20 and trapping a quantity of liquid in pipe 28 and chamber 8. Cam groove 39 will then hold the valve 20 in said intermediate position until after admission valve 6 closes. As the cam shaft continues to rotate, cam groove 39 will move the distributor valve 20 over to align passage 24 with both distributor ports 21 and 22, and eccentric 36 will, at the same moment, push vent valve 12 off its seat. At this point in the operation, cam ring 50 will actuate switch 47 to open the motor circuit and stop rotation of the shaft. When vent valve 12 opens, the space around its valve stem and the passage 14 in the stem will permit vent line 15 to equalize the pressure between the sampling valve 6 and distributor valve 20 so that the sample trapped in such space may drain into sample can D. The sampler parts will then remain in the position shown in Fig. 1 until the start of the next sampling cycle. It is obvious that the sampling events may be speeded up or retarded by changing the ratio of the speed reducer, the speed of the motor, or by introducing a variable speed drive.

It is apparent that the sampling valve 6 with the associated vent valve 12 constitutes means for performing the dual function of admitting a liquid sample from the stream being sampled, and releasing the sample to the can D by permitting balancing of the pressure both above and below the sample trapped between the admission or sampling valve 6 and the distributor valve 20 so it may flow gently into the sample can. A turbulent discharge and resulting evaporation of the sample is thus prevented. While admission valve 6 is held to its seat by the pressure of the spring 10, it is contemplated that the diameter of this valve will usually be larger than the valve stem 9 so as to utilize the unbalanced pressure above and below the valve to hold the valve to its seat.

In the form of the invention shown in Figs. 3, 4 and 5, which is simpler and comprises fewer parts than the first illustrated form, the unit F combines the functions of the units A, B and C of said first form, and the sample receiving can G and the operating unit H correspond to the can D and the control and operating unit E of the first form, respectively.

The unit F, in its present embodiment, comprises a block or body 60 having a vertical passage 61 therethrough in communication at its upper end with a pipe or conduit 62 leading from the line carrying the oil or other liquid being sampled. The passage 61 is intercepted by two horizontal bores 63 and 64 spaced lengthwise thereof and forms therebetween the sample metering space 65. The lower end of the passage 61 is connected by a downwardly extending tube 66 to the interior of the sample can G. Slide valves 67 and 68 are mounted, respectively, in the bores 63 and 64, the former serving as an admission valve to the metering space 65 of the passage 61 and the latter serving as a distributing valve controlling the discharge from said space.

The valve 67 has a cross port 69 therein which, when the valve is in open position or at the limit of its stroke to the right, registers with the passage 61 and permits filling of the metering space 65 from the supply line 62, as shown in Fig. 4. The valve 68 has a cross port 70 therein which, when the valve is in open position or at the forward or right end of its stroke, registers with the passage 61, as in Fig. 3. The two valves are operated as hereinafter described to alternately open the passage 61 so that when one valve is closed the other is opened.

The sample can G, the same as in Fig. 1, comprises a closed vessel capable of withstanding internal pressure, and has a gland type fitting through which the tube 66 is projected. It is also provided with a normally closed relief valve 71 and a vent tube 72 extending from its top. This vent line communicates with the right or forward end of the valve receiving bore 63, and when the valve 67 is closed, such end communicates with the upper end of the metering space 65 of the passage 61 through an angle-passage 73 in the forward end of the valve. In this position the cross port 69 of the valve 67 is closed to the passage 61. It is thus apparent that the upper end of the metering chamber 65 is vented to the can G to permit free flow of the metered liquid to the can when the valve 67 is in closed position and the valve 68 is in open position with respect to the passage 61, as shown in Fig. 3.

When the valve 68 is in closed position, as shown in Fig. 4, an angle-passage 74 in its forward end portion opens communication between the metering space 65 and a drain pipe 75, thus permitting purging of the system of all liquid remaining from the previous sample. The drainage pipe leads from the forward end of the bore 64 to a suitable place of drainage disposal.

It is apparent that the volume of liquid collected for each sampling operation is determined by the capacity of the metering space 65 in the passage 61, and that this may be varied by changing the size of such space.

The valve control and operating means H shown in Fig. 3 comprises, in the present instance, an electric motor 80 driving a shaft 81 through a speed reducer 82. This shaft is mounted in suitable bearings at right angles to the axes of the valve bores 63 and 64 and has two eccentrics 84 and 85 connected by pitmans 86 and 87 to the outer ends of the respective valves 67 and 68. The throws of the two eccentrics are diametrically opposite so that the valves have reverse movements in unison.

An electric limit switch 90 is mounted in a housing 91 (Fig. 5) and has a cam rotor 92 fixed on the shaft inside the housing and this cam has a depression 93 in its periphery at one side of its axis. A switch arm 94, pivoted at 95 at one side of the cam periphery to an insulation ring 96, carries a roller 97 at its free end in position to ride on the cam periphery of the rotor 92. An electric switch contact 98 is yieldingly carried by the arm 94 and engages a stationary contact 99 to close the switch circuit when the roller is traveling on the concentric portion of the rotor periphery and to open said circuit when the roller is in the depression 93. The ring 96 is rotatably adjustable in the housing and carries the contact 99 is addition to the pivot 95. The depression 93 is short and the roller 97 drops therein immediately at the end of a sample taking cycle, or of one complete rotation of the cam rotor 92, and passes therefrom at the beginning of the next cycle.

The motor 89 is in circuit with electric current supply wires 100 and 101 through respective leads 102 and 103, and the switch contacts 98 and 99 are in circuit with the lead 103 so that the motor starts and stops upon the respective closing and opening of said contacts.

In addition to the switch 90 a sequence timer 105 is disposed in the motor circuit in bridging relation to the switch 90, whereby the motor operating circuit is periodically closed by such timer and is opened at the end of a cycle by the limit switch 90. The normal at-rest position of the shaft 81 is with the valve 67 in closed and the valve 68 is open position with respect to the passage 61. During a revolution of the switch cam rotor 92, the positions of the valves 67 and 68 are reversed to permit a sample charge of liquid to enter the metering space 65 and the valves are then returned to normal positions to close the passage 61 to the supply line and open the metering space 65 to the discharge tube 66. At the end of a sample taking cycle the roller 97 drops into the rotor depression 93 and opens the contacts of the limit switch 90 to stop the drive motor. The motor now remains at-rest until started for the next sample taking cycle by the sequence timer.

In order to release the sample taking unit F of the liquid line pressure, except when receiving a sample charge, a solenoid valve 110 is located in the supply line 62 and this solenoid is energized to open the valve during a predetermined portion of each sample taking cycle. In the present instance, the solenoid circuit 111 is in connection with the lead wires 100 and 101 and a mercury switch is disposed therein. The mercury container 112 of this switch is carried by an upright arm of a bell crank lever 113 that is pivoted at 114 on the body 60. The other arm of this lever rests on a roller 115 carried by the connection between the pitman 86 and the valve 67, whereby the lever is rocked in first one direction and then the other to close and open the circuit by reciprocatory movements of the valve. The closing of the solenoid circuit is timed to take place approximately coincident with or slightly before the opening of the supply line 62 to the metering space 65 of the passage 61, while its closing takes place during the initial portion of the rearward stroke of the valve.

In each form of the invention an admission valve, 6 in the one case and 67 in the other, is periodically opened to permit a sample charge to pass from the supply line to the metering space, the distributing valve, 20 in one case and 68 in the other, being closed. During the last half of a sample taking cycle the admission valve in each form closes and the distributing valve opens to permit the liquid sample to discharge into the sample can. At the same time the vent line in each form is opened from the can to the top of the metering space. Also, in the beginning of a cycle in each case, after a closing of the distributing valve, the metering space is open to the drain to purge the sample dispenser and connecting piping of all liquid before the next sample is taken.

I wish it understood that my invention is not limited to any specific construction, arrangement or form of the parts, as it is capable of numerous modifications and changes without departing from the spirit of the claims.

What I claim is:

1. A liquid sample dispenser comprising means for connecting a liquid flow line with a sample receiving reservoir, said means including a passage with a sample metering portion, an admission valve between the flow line and said metering portion, a distributing valve at the lower end of said portion, mechanism having connections with said valves and operable during a sample taking cycle to open said admission valve and close said distributing valve and then at predetermined points in a cycle to close said admission valve and open said distributing valve, and means providing a vent for the metering portion of said passage and including a valve for automatically opening said vent when the admission valve is closed.

2. A liquid sample dispenser comprising means forming a passage for connecting a liquid flow line with a sample receiver, said means including an admission valve at the receiving end of said passage and a distributing valve in said passage in spaced relation to said first valve and toward the discharge end of the passage, the space in the passage intermediate said valves forming a sample metering portion, said admission and distributing valve standing in positions to respectively close and open said passages at the starting of a sample taking cycle, means having separate connection with said valves and operable to move said admission valve to open said passage and to move said distributing valve to close said passage during a predetermined initial portion of a cycle and operable during the remaining portion of a cycle to close the admission valve and open the distributing valve, and means for venting said passage between said two valves when the admission valve is closed.

3. A liquid sample dispenser comprising means forming a passage for connecting a liquid flow line with a sample receiver, said means including an admission valve at the receiving end of said passage and a distributing valve in said passage in spaced relation to said first valve and toward the discharge end of the passage, the space in the passage intermediate said valves forming a sample metering portion, said admission and distributing valve standing in positions to respectively close and open said passages at the starting of a sample taking cycle, means having separate connection with said valves and operable to move said admission valve to open said passage and to move said distributing valve to close said passage during a predetermined initial portion of a cycle and operable during the remaining portion of a cycle to close the admission valve and open the distributing valve, said sample receiver constituting a closed receptacle, and means in communication with the interior of the container for automatically venting said passage at its inlet end to said container when the admission valve is closed and preventing said venting when said admission valve is open.

4. A liquid sample dispenser for receiving samples under pressure from a flow line, comprising a closed sample receiver, means forming a passage between the flow line and said receiver and including a sample metering portion, an admission valve at the receiving end and a distributing valve at the discharge end of said metering portion, means operable to open and close each of said valves in predetermined relation whereby at the beginning of a sampling cycle the admission valve is opened and the distributing valve is closed and near the end of the cycle the admission valve is closed and the distributing valve is opened to dispense a metered sample, means forming a vent passage for the metering portion between said valves, a valve for said vent passage, and means operable in synchronized relation to said admission valve to move said vent valve to open said vent passage when the admission valve is closed and to close the vent passage when the admission valve is opened.

5. A liquid sample dispenser for receiving samples under pressure from a flow line, comprising a closed sample receiver, means forming a passage between the flow line and said receiver and including a sample metering portion, an admission valve at the receiving end and a distributing valve at the discharge end of said metering portion, means operable to open and close each of said valves in predetermined relation whereby at the beginning of a sample cycle the admission valve is opened and the distributing valve is closed and near the end of the cycle the admission valve is first closed and the distributing valve then opened to dispense a metered sample, means forming a vent passage for the metering portion between said valves, a valve for said vent passage, means operable in synchronized relation to said admission valve to move said vent valve to open said vent passage when the admission valve is closed and to close the vent passage when the admission valve is opened, and means forming a drainage passage from said first passage, said distributing valve having a passage therein to connect said first passage and drainage passage during a predetermined portion of the time said distributing valve closes said first passage to the receiver.

6. A liquid sample dispenser, comprising a closed sample receiving reservoir, means for connecting a liquid flow line with said reservoir, said means including a passage with a sample metering portion, an admission valve between the flow line and said metering portion and a distributing valve at the lower end of said portion, mechanism having connections with said valves and operable during a sample taking cycle to open said admission valve and close said distributing valve and then at predetermined points in a cycle to close said admission valve and open said distributing valve, means providing a vent between the metering portion of said passage and said reservoir and including a valve in said admission valve for opening said vent when the admission valve is closed and closing the vent when the admission valve is open.

7. A liquid sample dispenser, comprising a closed sample receiving reservoir, means for connecting a liquid flow line with said reservoir, said means including a passage with a sample metering portion, an admission valve between the flow line and said metering portion and a distributing valve at the lower end of said portion, mechanism having connections with said valves and operable during a sample taking cycle to open said admission valve and close said distributing valve and then at predetermined points in a cycle to close said admission valve and open said distributing valve, means providing a vent between the metering portion of said passage and said reservoir and including a valve in said admission valve for opening said vent when the admission valve is closed and closing the vent when the admission valve is open, means forming a drainage passage from the lower end of said metering portion, said distributing valve having a passage for opening said drainage passage when the distributing valve is in closed position and for closing said drainage passage when the distributing valve is in open position with respect to said first-mentioned passage.

8. A liquid sample dispenser for receiving samples under pressure from a flow line, comprising a sample receiver, means forming a passage between the flow line and said receiver and including a sample metering portion, an admission valve at the receiving end and a distributing valve at the discharge end of said metering portion, means operable to alternately open and close said valves whereby at the beginning of a sampling cycle the admission valve is open and the distributing valve is closed and near the end of the cycle the admission valve is closed and the distributing valve is opened to dispense a metered sample to said receiver, means providing a vent between said receiver and metering portion of said passage, and means operable to open the vent when the admission valve is closed.

9. A liquid sample dispenser for receiving samples under pressure from a flow line, comprising a sample receiver, means forming a passage between the flow line and said receiver and including a sample metering portion, an admission valve at the receiving end and a distributing valve at the discharge end of said metering portion, means operable to alternately open and close said valves whereby at the beginning of a sampling cycle the admission valve is open and the distributing valve is closed and near the end of the cycle the admission valve is closed and the distributing valve is opened to dispense a metered sample to said receiver, and means providing a vent between said receiver and metering portion of said passage, said admission valve having a passage therein which opens the vent to the metering portion between said valves when the admission valve is closed and which closes the vent when the admission valve is open.

10. A liquid sample dispenser for receiving samples under pressure from a flow line, comprising a sample receiver, means forming a passage between the flow line and said receiver and including a sample metering portion, an admission valve at the receiving end and a distributing valve at the discharge end of said metering portion, means operable to alternately open and close said valves whereby at the beginning of a sampling cycle the admission valve is open and the distributing valve is closed and near the end of the cycle the admission valve is first closed and the distributing valve is opened to dispense a metered sample to said receiver, means providing a vent between said receiver and metering portion of said passage, said admission valve having a passage therein which opens the vent to the metering space between said valves when the admission valve is closed and which closes said space when the admission valve is open, and means forming a drainage passage from the lower end of said metering space, said distributing valve having a passage which opens said drainage passage to said metering space when the distributing valve is closed and which is closed to said space when the distributing valve is open.

11. In a liquid sample dispenser for taking a sample from a liquid flow line, a sample receiving reservoir, means connecting said flow line with the reservoir and including a passage with a sample metering portion, an admission valve between the flow line and said metering portion, a distributing valve at the lower end of said portion, mechanism having connections with said valves and operable during a sample taking cycle to open said admission valve and close said distributing valve and later to close said admission valve and open said distributing valve, a valve in said connecting means between the flow line and the admission valve, and means operable by said mechanism to effect an opening of said flow line valve during opening movement of the admission valve and to effect a closing of the valve during a closing movement of the admission valve.

12. In a liquid sample dispenser for taking a sample from a liquid flow line, a sample receiving reservoir, means connecting said flow line with the reservoir and including a passage with a sample metering portion, an admission valve between the flow line and said metering portion, a distributing valve at the lower end of said metering portion, mechanism having connections with said valves and operable during a sample taking cycle to open said admission valve and close said distributing valve and later to close said admission valve and open said distributing valve, an electric circuit, a solenoid valve in connection with said circuit and normally closing said connecting means between the flow line and the admission valve, a switch in said circuit, and means operable during an opening movement of said admission valve to close said switch and energize said solenoid valve to open the flow line and operable during a closing movement of said admission valve to open said switch.

13. In a liquid sample dispenser having a metering passage for providing communication between a liquid flow stream and a receiver, an admission valve unit including a cylinder at the inlet end of said passage for attaching to a flow line, an admission valve slidably mounted in said cylinder and operable to open and close the inlet end of said passage, said valve having an axial vent passage in communication with said first passage at the outlet side of the valve and with a space exteriorly of said unit, a valve for closing said vent passage and standing open when the admission valve is closed, and means operable during the initial portion of a sample taking cycle to close said vent valve and open said admission valve and during the last portion of such cycle to first close said admission valve and then open the vent valve.

14. In a liquid sample dispenser having a metering passage for providing communication between a liquid flow stream and a sample receiver, an admission valve unit at the inlet end of said passage, said unit comprising a cylinder affording communication at one end between said passage and a flow stream, a plunger member slidingly movable in said cylinder with one end exposed and having an axial bore in its inner end, an admission valve adapted to seat in the passage communicating end of said cylinder to close said passage and having its stem slidingly mounted in the member bore, said valve and its stem having an axial bore therein open to the passage at the outlet side of the valve, means urging a limited outward movement of said valve relative to the member, a vent valve for closing the passage end of said bore and having a stem projecting through said bore and attaching to said member to move therewith, said bore and said vent valve stem cooperating to form a vent passage from said metering passage through the outlet side of the admission valve to a space externally of said unit, and means operable to impart predetermined axial movements to said vent valve to simultaneously close said vent passage and move the admission valve to open position and to open the vent valve after closing of the admission valve.

15. In a liquid sample dispenser, means forming a metering passage for connecting at its inlet end to a liquid flow pipe, an admission valve normally closing the inlet end of said passage, said passage having a vent at its inlet end, means reciprocable to move said admission valve to open position and simultaneously close said vent and then to permit closing of said admission valve and to open said vent, a distributor valve operable to periodically open and close said metering passage at the outlet side of the metering portion thereof, means for operating said reciprocable means, and means operating in predetermined timed relation to said last means to periodically move said distributor valve to close and to open the outlet end of said passage.

16. A combination as called for in claim 15, together with a closed container into which samples are discharged from said passage and with which said vent has communication.

17. In a liquid sample dispenser having means forming a sample metering passage between a liquid flow supply and a sample receiving container, said passage having a vent in communication with the container, an admission valve normally closing the inlet end of said passage, a vent valve, means operable to impart predetermined movements to said vent valve to simultaneously close said vent and to open said admission valve and then after a predetermined pause to permit closing of the admission valve and to open the vent valve, a distributing valve movable into passage opening and closing positions, and means synchronized with said first means to operate said last valve to close said passage when the admission valve is open and to open the passage at approximately the time of closing of the admission valve.

18. A combination as called for in claim 17, wherein said distributor valve has a drainage passage which is open to said first passage during a portion of the period such valve is in the first-mentioned closed relation to the first passage.

References Cited in the file of this patent

UNITED STATES PATENTS

| Number | Name | Date |
|---|---|---|
| 1,553,215 | Christenson | Sept. 8, 1925 |
| 1,594,052 | Draver | July 27, 1926 |
| 2,183,338 | Slough | Dec. 12, 1939 |
| 2,411,837 | Stephens | Nov. 26, 1946 |
| 2,534,489 | Webber et al. | Dec. 19, 1950 |
| 2,548,139 | Blum | Apr. 10, 1951 |